INVENTORS.
HOWARD R. KUTCHER,
ROBERT M. TRIMBLE &
SELMER G. VON STOCKER

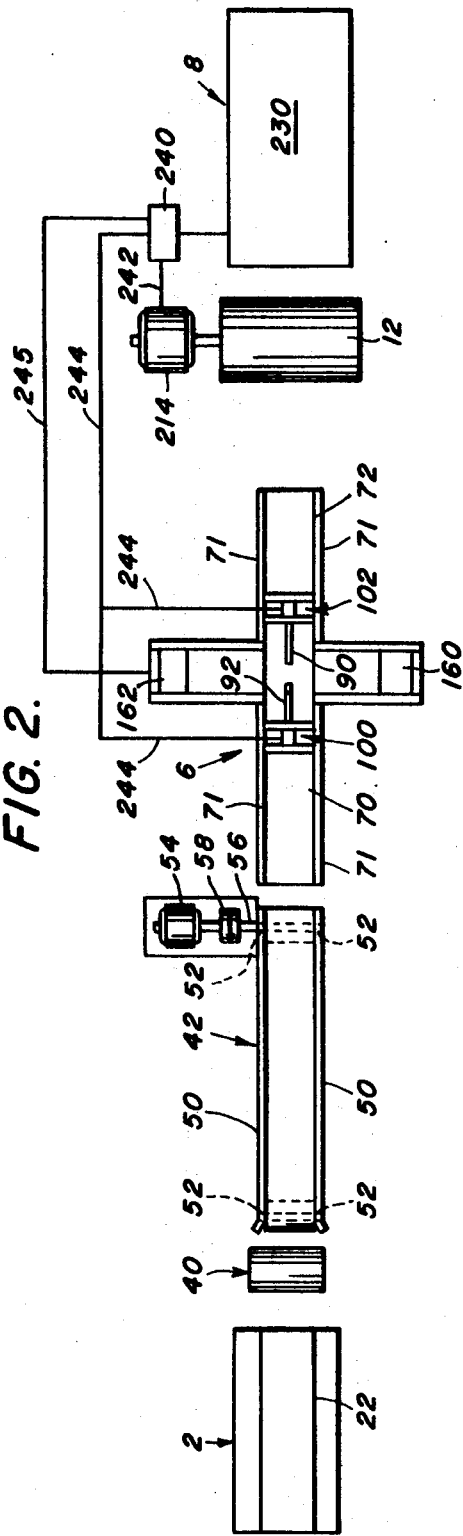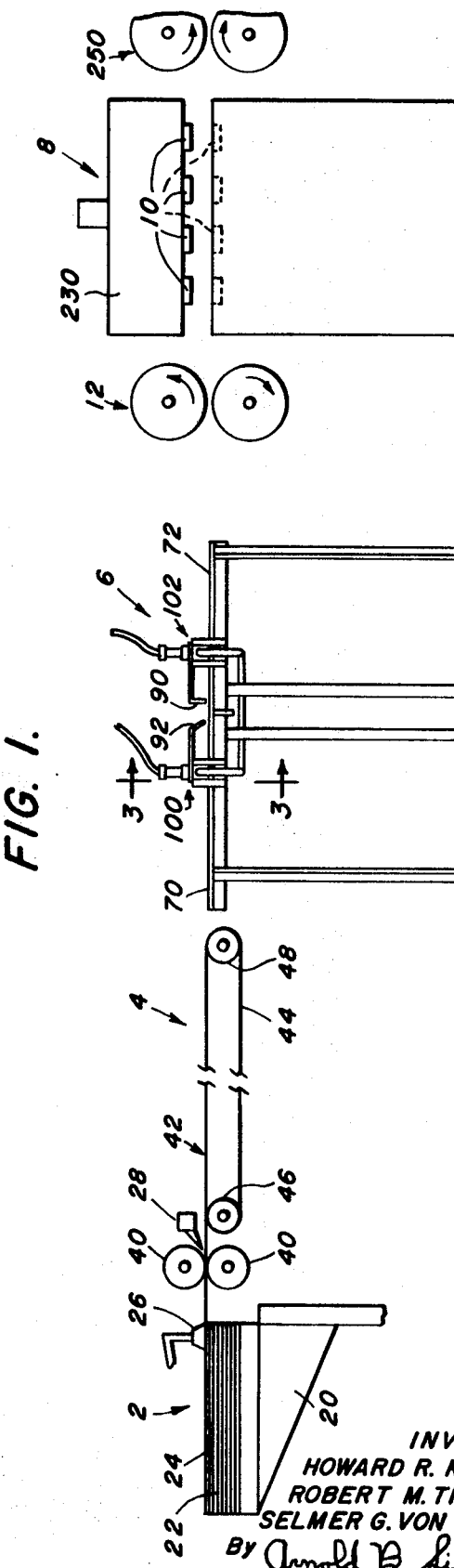

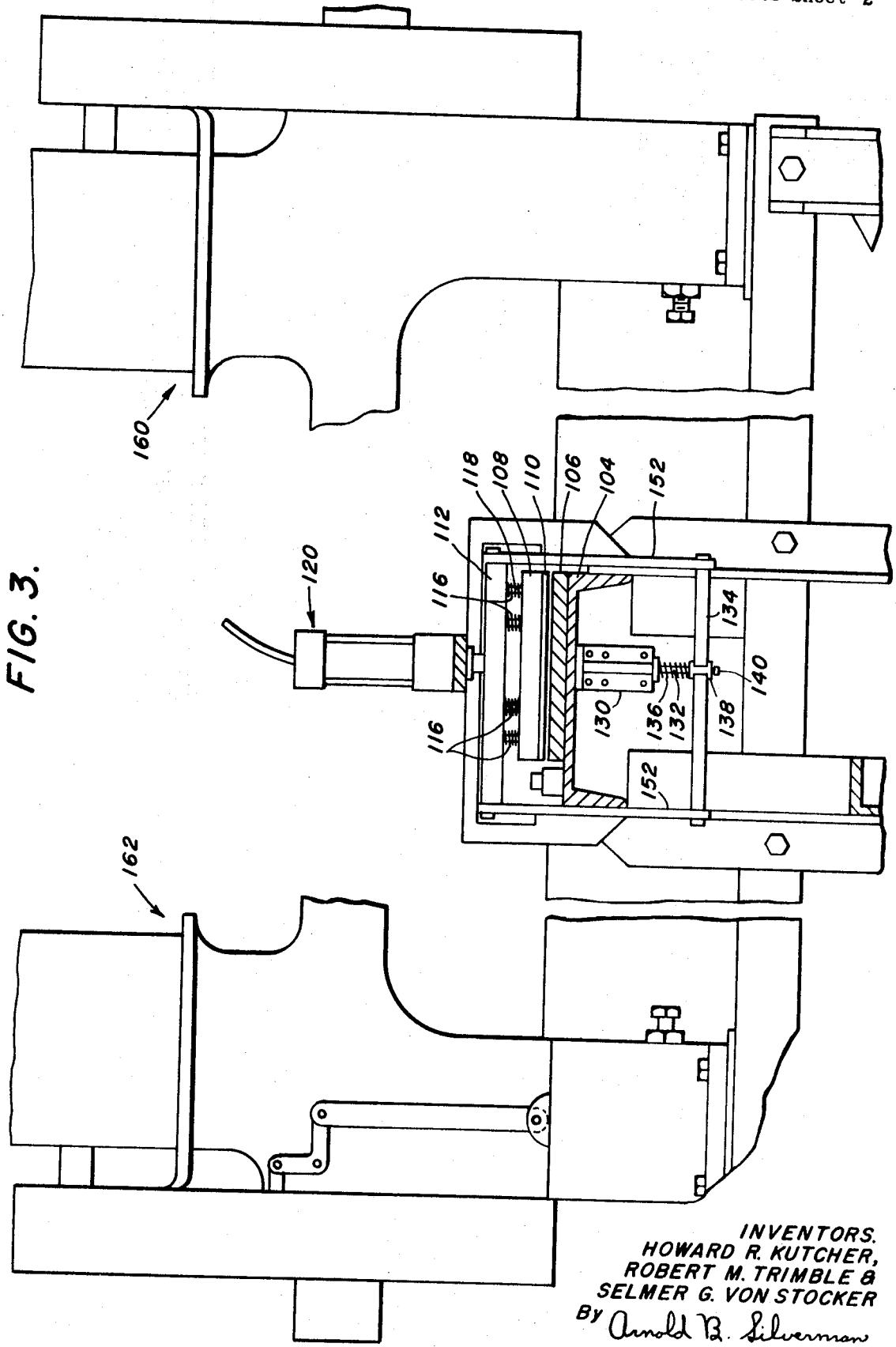

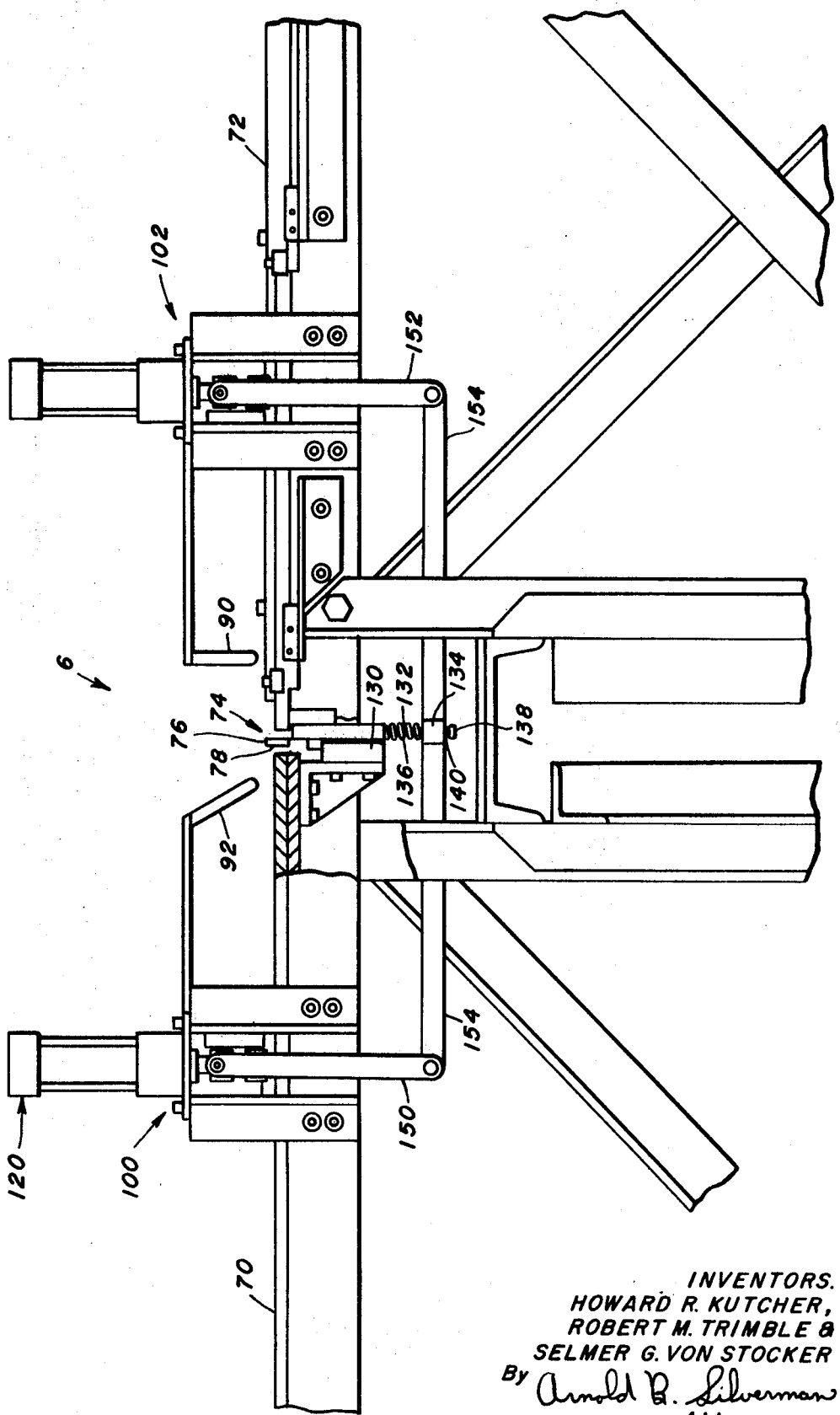

By Arnold B. Silverman
Attorney

# United States Patent Office 3,605,249
Patented Sept. 20, 1971

3,605,249
REGISTERED JOINDER OF SHEET
Howard R. Kutcher, Allison Park, and Robert M. Trimble and Selmer G. Von Stocker, Pittsburgh, Pa., assignors to Aluminum Company of America, Pittsburgh, Pa.
Filed July 22, 1969, Ser. No. 843,686
Int. Cl. B23g *3/00;* B23p *19/00, 19/04*
U.S. Cl. 29—429
17 Claims

ABSTRACT OF THE DISCLOSURE

Apparatus for sequentially effecting registered joinder of sheets of material. Sheet transporting means for sequentially moving sheets to a joining station, registry means for raising the trailing end of a leading sheet and engaging the leading end of a trailing sheet. First sheet clamping means disposed rearwardly of the registry means and second sheet clamping means disposed forwardly of the registry means. Joining means for establishing the joint while the sheets are clamped in registered position and control means for coordinating operation of the clamping means and the joining means. The registry means has a vertically reciprocating registry bar provided with sheet engaging faces. Operating means connecting the clamping means with the registry bar to establish movement of the registry bar responsive to movement of the clamping means.

A method of effecting registered joinder of sheets of material. Automatically feeding a sheet forwardly into contact with registry means. Simultaneously raising the trailing end of a forwardly disposed sheet at the registry means. Clamping the sheets in registered position and securing fastening means to the clamped sheets. Unclamping the joined sheets and moving them forwardly to a position in which the trailing sheet becomes the leading sheet for the next cycle of operation.

BACKGROUND OF THE INVENTION

Field of the invention

This invention relates to apparatus and method for the sequential registered joinder of individual sheets to provide a continuous strip. More specifically, this invention relates to an automatic system for joining printed sheets to provide a continuous registered strip adapted for continuous feed to a single or multiple die press.

Description of the prior art

It has been known to provide a printed pattern on sheets of material, as by lithography, wherein the individual lithographed elements are ultimately intended to be severed from the parent stock. Such systems are frequently employed wherein multiple stage forming operations are contemplated prior to severance of the article from the parent material. One problem encountered with such systems is the need to individually register the patterns on each successive sheet with the die systems which will be operating upon the same. This, of course, necessitates inefficient and burdensome handling of each sheet on an individual basis.

While it is known to lithograph or otherwise provide a pattern on coils of material, such as metal sheet, such systems, as presently known, are inadequate for multistage forming operations as, for example, in a multiple die press. The difficulty arises from printing tolerances. In a single stage operation, it is a simple matter to periodically reset the coil position with respect to the single die in order to eliminate inaccuracies resulting from tolerance variations. With respect to a continous coil in a multiple stage operation, however, the coil may not be registered with respect to one die, without also affecting the registration with respect to the other dies. Thus, corrective movement of the coil to effect registry of one portion of the coil with respect to one die is likely to eliminate registry of other portions of the coil with respect to one or more additional dies.

Increasing the problem is the fact that as a coil of sheet is printed the effect of the tolerance variations becomes cumulative. Unlike the situation wherein individual sheets are employed, the ability to deal with a finite relatively small length of sheet and thereby limit the cumulative registry variations is not present.

An additional factor of substantial importance is the fact that lithography speeds with respect to individual sheets are much faster than that obtainable with coiled material. The maximum speed for printing the patterns on the material is, therefore, highest with respect to sheet, while sheet is not as desirable with respect to the feeding of multistage presses, as compared with coiled material.

It has been suggested, in U.S. Patent 1,790,301, that with respect to plain unprinted sheet, adjacent strips may be overlapped and spot welded to eliminate the individual feeding of sheet to a punch press. In this fashion, the problems inherent in the individual handling of sheets to be feed to a press are eliminated.

There is lacking, however, an apparatus for automatic feeding of sheets, the transfer of sheets to the joining area by automatic means, the clamping of sheets in joining position and the automatic registration of adjacent ends to permit formation of a butt joint. There remains, therefore, the problem of the absence of an automated system for permitting the advantageous rapid lithographing of individual sheets, while feeding a continuous registered lithographed strip or coil of material to a multistage press. There is also lacking a system for economically and rapidly joining adjacent sheets while maintaining them firmly clamped in registered position during joinder.

SUMMARY OF THE INVENTION

This invention provides apparatus and method for solving the above-enumerated problems. The apparatus of this invention is designed to automatically sequentially feed individual sheets of printed material which are transported to a joining station, automatically registered, and firmly clamped in registered position for establishment of the joint.

Control means coordinate the operation of the clamping means with the joining means. The registry means has a vertically reciprocated registry bar which is adapted to raise the trailing end of the leading sheet and also serve as an abutment to stop the forward movement of the leading end of the trailing sheet. The sheets are then clamped in registered position with the registry bar moving downwardly. Operating means are provided for moving the registry bar responsive to operation of the clamping means. The operating means may have a mechanical linkage which effects this responsive movement.

Transporting means are provided to convey the individual sheets from the sheet supply means to the joining station. The transporting means may have a pair of feed rolls followed by an endless supply conveyor which transports the sheets to the joining station.

The clamping means may each have a pair of clamping elements which are opened and closed by means of a suitable fluid cylinder. A first clamping means is disposed rearwardly of the registry means and a second clamping means is disposed forwardly of the registry means. A guide member is disposed forwardly of the first clamping means for limiting the raising of the leading end of the trailing sheet. A second guide member is disposed rearwardly of the second clamping means for cooperating with the registry means to increase the elevation of the trailing end of the leading sheet.

Joining means, which in a preferred form of the invention consists of a pair of stapling units, are positioned generally overlying the registry means and are adapted to establish the joint when the clamping means and registry means are in their lowered positions.

The method of this invention contemplates sequential feeding of printed sheets by automatic means and simultaneous raising of the trailing ends of the forwardly disposed sheet to permit passage of the leading end of the trailing sheet thereunder and into engagement with the registry means. Clamping the sheets in registered position prevents relative longitudinal movement therebetween after registry but prior to establishment of the joint. The clamped sheets are then secured by fastening means to establish the joint. The joined strip is then unclamped to permit withdrawal. The strip may then conveniently be fed directly into a press having a progressive die set or fed onto a reel for storage.

It is an object of this invention to provide apparatus and a method for the automatic conversion of a pile of printed sheets into a continuous registered strip obtained by sequential automatic joinder of the individual sheets.

It is another object of this invention to provide a system for automatically transporting individual sheets to a registry means which effects registration with respect to a leading sheet and a trailing sheet to permit subsequent clamping and joinder thereof.

It is another object of this invention to provide a system wherein prior to sheet joinder, registry of the trailing sheet and the lithographed pattern therein with respect to the first die of said press is effected and the continuous strip formed by sheet joinder is fed directly to a press having a progressive die set.

It is another object of this invention to provide for a continuous strip of uniform longitudinal thickness with a butt joint securing adjacent sheets in registered position by means of fasteners not passing through the printed pattern on said sheets.

It is yet another object of this invention to provide control means for coordinating the operation of the automatic supply and sheet transfer systems, the registry means, the clamping means, the press feed means and the multistage die.

These and other objects of this invention will be more fully understood from the following description of the invention, on reference to the illustrations appended hereto.

BRIEF DESCRIPTION OF THE DRAWINGS

FIG. 1 is an elevational view, partially schematic, illustrating one form of apparatus contemplated by this invention.

FIG. 2 is a partially schematic plan view of the apparatus illustrated in FIG. 1.

FIG. 3 is a sectional elevational view taken along 3—3 of FIG. 1.

FIG. 4 is a detailed elevational view of the joining station shown in FIG. 3.

DESCRIPTION OF THE PREFERRED EMBODIMENTS

Figure 5:
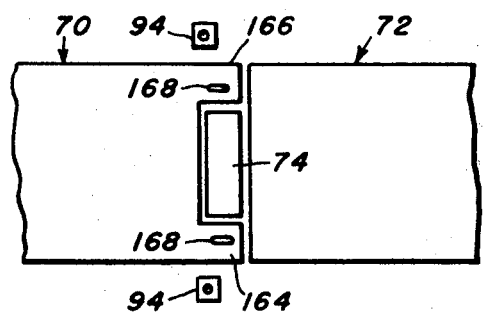
FIG. 5 is a fragmentary plan view illustrating the reegistry bar and surrounding portions of the joining station.

Considering now in greater detail FIGS. 1 and 2, the subassemblies which combine to establish the apparatus of this invention will be considered generally. At the left hand portion of these figures is shown the automatic sheet supply means 2. Sheet transporting means 4 sequentially receives the individual sheets from supply means 2. The sheets are then transferred to the joining station 6. From joining station 6 the sheets are fed to press 8, which has a multistage die set 10, by means of press feed rollers 12.

As will be described in greater detail below, these units provide for automated supply, handling, registry and joinder of the individual sheets and feed of the joined strip.

The term "printed sheet" as used herein shall refer to a metal sheet having a pattern over all or portions of one or both sides thereof applied by lithographing, or other forms of printing, and will include sheet having a pattern formation, as by chemical or mechanical means such as scrolling.

Automatic sheet supply means 2 has a supporting table 20 upon which is positioned a pile of sheets 22. The supporting table 20 may be provided with an elevator system (not shown) which automatically raises the pile of sheets 22 as sheets are removed, in order to permit feeding of the top sheet 24 from the same level. The top sheet 24 is lifted off of the pile 22 by means of vacuum lifter 26. As the vacuum lifter is raised along with the engaged top sheet 24, sheet separator 28 directs a blast of air toward the top sheet 24 in order to prevent undesired adherence of the second sheet to the top sheet 24. The top sheet 24 is then transferred to sheet transporting means 4.

Top sheet 24 is received within supply rolls 40 which pull the sheet forward. As soon as engagement by rolls 40 has been effected, vacuum lifter 26 releases the sheet and returns to engage the next sheet on the pile 22 after sufficient delay, as determined by a timer, the position of the released sheet or the number of strokes of the press 8, to permit the trailing end of the released sheet to move entirely off of the pile 22. Forwardly of the supply rolls 40 is a conveyor 42, which, in the form illustrated in FIGS. 1 and 2, has an endless conveyor belt 44 which travels around rollers 46, 48. The rollers 46, 48 may conveniently be provided with sprockets and the belt with corrugations to improve the efficiency of engagement. These rolls 46, 48 are journaled within openings 52 in guide members 50. In the form shown, roller 48 is driven by motor 54 through shaft 56. A friction clutch 58 is interposed between motor 54 and roller 48 in order to provide for relative slippage where desired. As the sheets are moved along conveyor 42, guide members 50 which extend upwardly above the top level of conveyor 42 serve to prevent undesired lateral displacement of the sheets.

Figure 12:
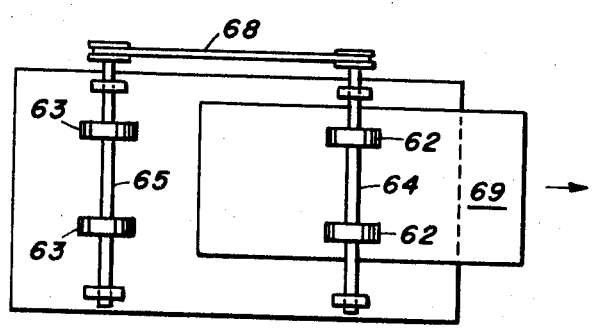
FIG. 12 shows a plan view of a modified form of sheet transporting means.
Figure 13:
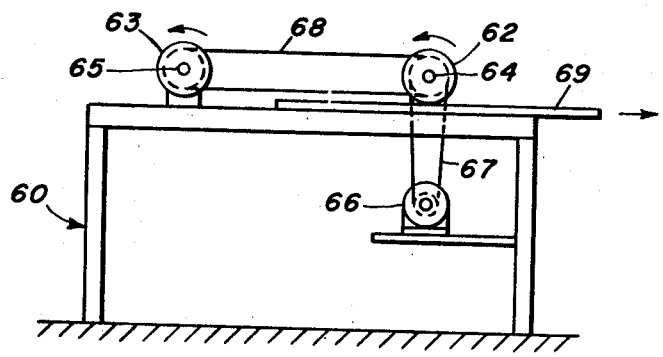
FIG. 13 is an elevational view of the sheet transporting means of FIG. 12.

An alternate form of sheet transporting means 4 is illustrated in FIGS. 12 and 13. A fixed table 60 is provided with a series of rolls 62, 63 secured to shafts 64, 65 respectively. The shafts 64, 65 are driven by motor 66 through belts 67, 68. The rolls are in contact with sheet 69 and urge it forwardly along the surface of table 60 to joining sector 6. The surface of table 60 is preferably provided with friction reducing means such as Teflon in order to reduce friction between the moving sheet and the table surface. Alternatively, rolls (not shown) mating with rolls 62, 63 may be mounted in mating underlying position with respect to rolls 62, 63 and thus facilitate free movement of the sheet.

Figure 6:
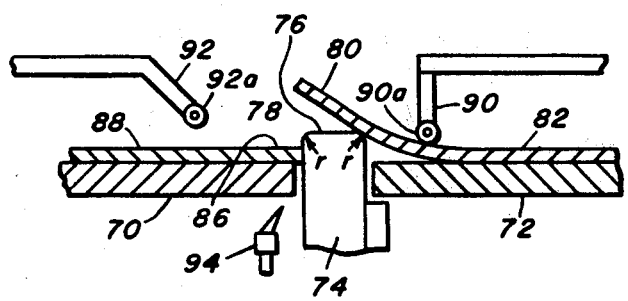
FIG. 6 is a fragmentary elevational view illustrating two sheets positioned in the joining sector.

Referring now to FIGS. 1 and 4, in the joining sector 6, the sheet 69 is received on stationary table sector 70 and is discharged after joinder from stationary table sector 72. Each sector 70, 72 is provided with sheet guides 71 which resist lateral displacement of the sheets. As will be described in greater detail below, registry bar 74 reciprocates in a vertical direction. Registry bar 74 has an upper sheet engaging surface 76 and a lateral sheet engaging surface 78. As is shown in greater detail in FIG. 6, the registry bar 74 when in its raised position has upper sheet engaging surface 76 in contact with the undersurface of trailing end 80 of sheet 82 thereby raising the same above the elevation of the stationary table sector 70. Registry bar 74 may be provided with corners having a large radius $r$ in order to permit free sliding passage of the sheets thereover without damaging the sheet surface. The leading end 86 of trailing sheet 88 engages lateral sheet engaging surface 78 and is stopped thereby.

Guide member 90, which overlies table sector 72, cooperates with registry bar 74 to increase the angle of inclination of trailing end 80. If desired, supplemental means 94 (FIG. 6), which may be air operated, for raising the trailing end of the leading sheet at an earlier time may be provided. Such means 94 may consist of air jet nozzles positioned adjacent opposed sides of table sector 70 in close proximity thereto. Guide member 92, which overlies table sector 70, serves to restrict the extent to which sheet 88 may be raised above stationary table sector 70. In the form shown in FIG. 6, members 90, 92 have roller members 90a, 92a, respectively, provided at their free ends in order to facilitate movement of the sheets.

The leading sheet 82 is stopped with its trailing end 80 in a predetermined position with respect to registry bar 74. This may be readily accomplished by providing an index reference mark or spring mounted stop (not shown) on the press 8 to provide a stop reference for the leading end of the leading sheet 82. After the forward movement of sheet 88 is stopped, the forward movement of sheet 82 is stopped and the registry bar 74 is lowered in order to permit lowering of trailing end 80 and positioning the adjacent edges of sheets 82, 88 in substantially co-planar abutting relationship. Clamping of the sheets 82, 88 in this position is then effected.

Referring once again to FIGS. 1 through 4, it is seen that clamping member 100 is positioned rearwardly of registry bar 74 and clamping member 102 is positioned forwardly of registry bar 74. As is seen in FIG. 3, the clamping members each have a base portion 104 which may be covered with a cushion layer 106, which may conveniently be polyurethane, felt or like protective compressible material. Overlying the stationary base portion 104 is a vertically reciprocating clamping element 108 which also may have a protective cushion layer 110. Clamping element 108 is secured to support member 112 through connectors 116 which pass through compression springs 118. Overlying and operatively connected with support member 112 is a fluid cylinder 120, which may be of any suitable variety, but is conveniently air operated. Movement of the pistons of fluid cylinders 120 serves to move clamping element 108 into and out of clamping position with respect to base portion 104. By operating the cylinders 120 simultaneous clamping and release of the sheets may be effected in coordinated fashion.

The vertical reciprocating movement of registry bar 74 is coordinated with the operation of cylinders 100, 102. When the clamping members 100, 102 are in their raised or unclamped position, prior to stopping forward movement of sheets 82, 88, the registry bar is also in its uppermost position. When the clamping members 100, 102 are lowered in order to firmly clamp the registered sheets in the desired registered position for joinder, the registry bar 74 is also lowered to position the sheet edges in registered abutting substantially co-planar relationship.

In order to mechanically coordinate movement of registry bar 74 with the clamping members 100, 102, mechanical linkage is provided. Referring to FIGS. 3 and 4, it is seen that registry bar 74 is rightly secured to supporting element 130 in overlying position with respect thereto. Spindle 132 depends from the lower extremity of supporting element 130 and passes through an opening in linking element 134. A compression spring 136 is positioned on spindle 132 intermediate supporting element 130 and linking element 134. Nut 138 is secured to the free threaded end 140 of spindle 132 in order to limit the relative movement between spindle 132 and linking element 134. A pair of vertically disposed arms 150, 152 depend from opposed sides of clamping members 100, 102, respectively. A pair of connecting arms 154 are secured at opposed ends to depending arms 150 and 152. Transverse linking element 134 has its opposed ends secured to the connecting arms 154.

Depending arms 150, 152 are secured to support members 112 and move upwardly and downwardly with support members 112 (FIG. 3). It will thus be appreciated that downward movement of support members 112 produces downward movement of vertical depending arms 150, 152, and horizontal connecting arms 154. This movement in turn produces downward movement of linking element 134 which in turn results in lowering of registry bar 74 to its joining or lowermost position.

Referring is made to FIG. 3 and the specific form of joining means shown for purposes of illustration. As is shown in this figure and FIG. 2, a pair of stapling units 160, 162 are provided generally within the joining sector 6 on opposed sides of the registry bar 74. These units are of a conventional variety and the details form no part of this invention. The stapling heads (not shown) move downwardly and cooperate with an underlying anvil to provide the desired stapling action. The anvils may be integral parts of the stapling units 160, 162 or separate members. As is shown in FIG. 5, stationary table sector 70 has extensions 164, 166 which serve as anvils for the stapling units, respectively. Each table extension 164, 166 is provided with an anvil having a forming groove 168 which facilitates effecting closing deformation of the staples.

After the two registered sheets have been secured by clamping members 100, 102 and the registry bar 74 is in its lower position, the stapling units 160, 162 are activated and the stapler heads move downwardly to establish a stapled joint between the registered sheets 88, 82.

Figure 8:
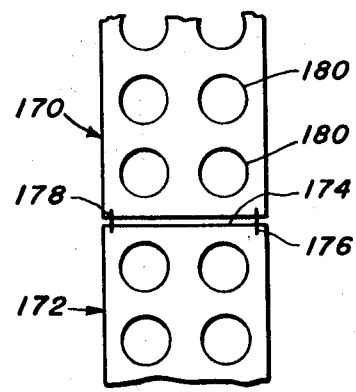
FIGS. 8 and 9 illustrate two forms of patterned sheet after butt joinder.

In the form illustrated in FIG. 8, printed sheets 170, 172 are joined by means of a butt joint 174 secured by staples 176, 178. The joint is such that each leg of a given staple 176, 178 extends through only one of the sheets 170, 172. It is noted that a lithographed pattern 180 is symmetrically positioned on each printed sheet 170, 172 and that the staples 176, 178 are disposed closely adjacent the transverse edges of the sheets 170, 172 and not in contact with any portion of the lithographed pattern 180.

Figure 7:
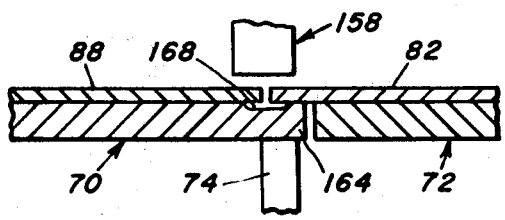
FIG. 7 is similar to FIG. 6 but shows the registration bar at its lower position, with the joint about to be effected.

As is shown in FIG. 7, the metal sheets to be joined 82, 88 are secured in registered position. Stapler head 158 moves downwardly to cooperate with table extension 164 having forming groove 168 to establish the joint.

Figure 9:
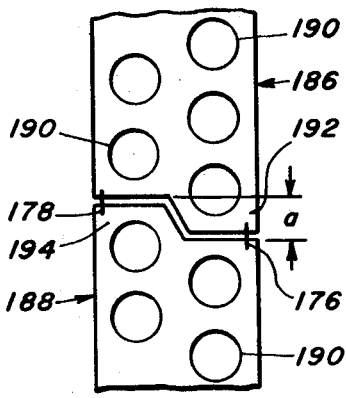

In the form illustrated in FIG. 8, the stapler units employed in effecting joint 174 were positioned at the same longitudinal point within the joining area. This was done as a result of the uniformity of the lithographed pattern 180 and the resultant rectangular sheet configuration. In the form illustrated in FIG. 9, sheets 186, 188 are provided with a staggered lithographed pattern 190. As a result, the printed sheets have extensions 192, 194 respectively. This provides a complementary irregular line of joinder with the staples longitudinally displaced from each other by a dimension $a$. A corresponding difference in longitudinal position of the stapling units is required.

The sheet secured in a butt joint in the above-described fashion provide precisely controlled registration of the respective sheets. The staples are of sufficient strength to provide substantial tensile strength to the joined sheets which are capable of withstanding stresses encountered in normal sheet handling and press operation. As the joint is a butt joint and does not appreciably alter the sheet thicknesses, the strip of joined sheets is of substantially uniform thickness throughout their length and no substantial compensating change to handling equipment is required.

Figure 10:
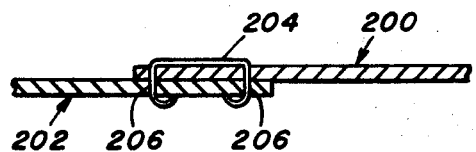
FIG. 10 is a fragmentary sectional view illustrating a lap joint of adjacent sheets.

While the above description has shown the butt joint form, which is preferred, an overlap joint may be provided if desired. As is shown in FIG. 10, leading metal sheet 200 overlaps trailing metal sheet 202 and staple 204 has each leg extending through both sheets 200, 202. In establishing such a joint, the reference point with respect to which the leading sheet 200 is stopped is altered by moving it rearwardly by increasing the length of sheet or by moving reference surface 78 forwardly. When the registry bar 74 raises the trailing end of the leading sheet 200, the leading end of trailing sheet 202 will move underneath. Upon lowering the registry bar 74, the registered overlapped position will be established. Clamping and stapling are effected in substantially the same manner as described above.

While in the above description reference has been made extensively to the preferred form of joining means, i.e., stapling, it will be appreciated that other forms of joint may be employed in lieu of or in addition to stapling. Pressure sensitive tape, for example, might conveniently be employed. One relative disadvantage of such a fastening means as compared with stapling is that the latter may be effected instantaneously and with both staples acting simultaneously, while pressure sensitive tape, if it is to continuously span the joint, must be progressively applied. Also, the sheets might be joined by suitable adhesives or welding, such as spot welding or capacitor discharge welding, for example.

Referring once again to FIG. 1, it is seen that upon emerging from joining station or sector 6, the joined sheet is received within press feed rolls 12. The operation of these rolls is coordinated with the operation of the multiple die press 8 so that the rolls are moving to supply sheet to the press only during the period when the upper portions of die set 10 are not in engagement with the lower portions of die set 10 to thereby provide a clearance within the press 8 through which the sheet may pass. While the press ram will continue to move upwardly after the initial separation of the elements of the die set 10 and will subsequently move downwardly prior to reestablishing contact between the die elements, for convenience of reference herein this period of time between die element separation and subsequent reengagement shall be referred to as the "idle period" or "press idling." While the press ram is in motion during a substantial portion of this period, the dies perform no work on the sheet during this period. The rolls 12 are also controlled so as to advance the sheet in intervals equal to the distance between the successive die sets 10. As the sheets have been joined in registered fashion and the feed rolls 12 advance the joined sheet a predetermined uniform amount, each portion of the lithographed patterns 180, 190 is initially properly registered with the first die set and move sequentially into proper registration with the subsequent die sets.

Figure 11:
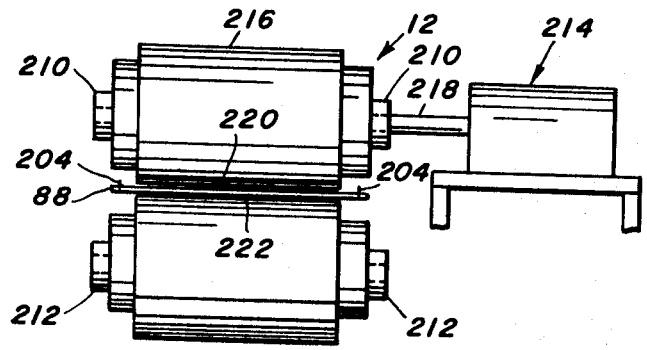
FIG. 11 illustrates a pair of press feed rolls adapted to feed the continuously joined strip.

As is shown generally in FIG. 11, the press feed rolls 12 are supported in journals 210, 212. The rolls are driven by motor 214 which is connected to roll 216 by shaft 218. The rolls 12 are provided with sheet engaging surfaces 220, 222 which are of lesser longitudinal extent than the transverse width of sheet 88. The rolls therefore have a number of undercut surfaces 226 which facilitate passage of staples 204 or other enlarged fasteners, therethrough without interference therewith.

The press 8 is a conventional press having a progressive die set 10. After the initial lithographed pattern 180, 190 has passed to the last die in the set, each downward stroke of the press ram 230 causes each die set 10 to perform a different operation on a different pattern element of the sheet interposed. Removal of the sheet from the press 8 may be facilitated by the use of rolls 250.

It will be appreciated that effective control of the various automatic elements must be provided in order for the apparatus to function properly. The starting point in such controls is the press 8. The joining station and the press feed rollers must be operated during the idle time of the press 8.

The automatic sheet supply means 2 and sheet transporting means 4 may, if desired, be operated with some degree of independence with respect to the joining sector 6 and press 8. As the leading end of the trailing sheet will engage the lateral surface 78 of registry bar 74, and move no farther, the sheet supply means 2 may transfer a top sheet 24 through supply rolls 40 to conveyor 42 at any time in advance of the press idle. The sole requirements are that the trailing sheet be in registry bar engaging position prior to clamping of the sheets and lowering of the registry bar, and that the trailing sheet has been moved forward after joinder prior to entry of the next succeeding trailing sheet. The conveyor 42 may be run continuously thus exerting a constant force which urges the trailing sheet forwardly into positive registry bar engaging position. In order to minimize the amount of resistive force generated between the endless conveyor belt 44 and the trailing sheet, a slip clutch 58 is provided intermediate the motor 54 and conveyor 42.

In order to properly register the sheet ends, the press feed rolls 12 must be stopped so that the registry bar may be lowered to permit clamping of the two stationary sheets in registered position. The stapler units 160, 162 are then operated to secure the adjacent registered edges in a firm joint structure. The clamping members 100, 102 are then raised to free the joined sheets. The press rolls 12 then advance the joined sheet a distance equal to the distance between successive die sets 10 of the press 8. After several cycles of advancement, the leading sheet (the rearmost portion of the continuous strip) is in registered position upon the upper sheet engaging surface 76 of registry bar 74, which is in its uppermost position. Prior to this time or substantially simultaneously therewith, the leading end of the trailing sheet has been brought into abutment with the lateral sheet engaging surface 78 of registry bar 74. During this period of idling of the press feed rolls 12, the clamping members 100, 102 secure the sheets in registered position. The joint is formed and the clamping members 100, 102 are then opened.

One convenient means of controlling the operation of the joining sector 6, press 8 and press feed rolls 12 is shown schematically in FIG. 2. A counter 240 of conventional variety is operatively connected with the press in order to record the number of strokes of the press. The counter 240 may conveniently be connected to the press flywheel or other rotating point. The operation of feed rolls 12 during press idle could be controlled by the counter 240 issuing a first signal to motor 214, which may conveniently be a stepping motor, through lead 242 after each press stroke. This would initiate roll 12 operation for a predetermined period of time or length of strip. This would advance the strip a distance equal to the distance between successive work stations on die set 10. For a sheet of given length, the press will make a given number of strokes before the trailing end of the sheet reaches registry position. The counter 240 may also be preset to generate a signal when this predetermined amount of strokes has been made. This signal could be transmitted through lead 244 to fluid cylinders 120 (or the controls, therefor) in order to initiate operation of the clamping members 100, 102. This signal would also be transmitted to stapler units 160, 162 through lead 245 to trigger operation thereof. A suitable time delay device such as a relay or solenoid valve could be provided in order to delay operation of the stapler units 160, 162 until after movement of the clamping members 100, 102 to the sheet securing position. The stapler units 160, 162 automatically return to their starting position after the stapling operation. Conventional means such as a timer or solenoid valve (not shown) may be employed to return the clamping members 100, 102 to their original position after completion of stapling.

Alternatively, the counter 240 could generate a signal which was transmitted solely to the fluid cylinder control system, with the stapler being operated responsive to a signal generated by movement of the clamping members 100, 102.

The operation of the press feed rolls 12 may be mechanically coordinated with the press operation by providing a cam driven indexing mechanism which is driven by timing belts connected to the press drive shaft and operates the rolls 12 responsive to press operation.

Alternatively, the feed rolls 12 and the joining sector 6 could be operated on the basis of a timer coordinated with the initiation of press operation. Operation of the timer could be initiated by the press stroke with resultant triggering of operation and stoppage of the feed rolls 12, clamping members 100, 102 and stapler units 160, 162. It may also be desired to coordinate the operation of the automatic sheet supply means 2 and sheet transporting means 4 with the operation of the press by either a counter generated signal or a timing device.

The method of this invention contemplates the continuous joined of individual sheets to provide a registered continuous strip. Automatic feeding means removes a sheet from a pile of sheets and sequentially individually transports the sheets to a joining sector. The sheets are automatically registered with the trailing end of the leading sheet being mechanically positioned at the proper point with respect to the leading end of the trailing sheet. The sheets are then each independently clamped and fastening means are secured to connect the sheets in registered joined fashion. The joined sheets are then freed from the clamping restraint and advanced forwardly until the trailing sheet is in position to serve as the leading sheet for the next cycle. In the preferred form the sheets are joined in substantially coplanar, edge-to-edge abutment by means of independent fasteners such as staples. A lithographed pattern on sheets to be joined may be presented either symmetrically or in staggered form.

In a preferred method of setting up for the practice of the process of this invention, a leading sheet is positioned with its leading edge in registry with respect to the first die of the press. The registry bar is then positioned with respect to the trailing edge of the leading sheet so as to place lateral sheet engaging surface 78 in position to hold the leading edge of the trailing sheet in such position as to provide for registered joiner of the two sheets. As the leading sheet has its lithographed pattern in registry with the first die and the trailing sheet will be joined in registered position with respect to the leading sheet, the lithographed pattern on the trailing sheet will also be in registry with said first die. Thus, each sequential registered joiner of trailing and leading sheets will provide the desired registered continuous strip of material entering the multistage press.

Considering now a typical cycle of operation of the apparatus, a pile of sheets is positioned on supporting table 20 of automatic sheet supply means 2. The top sheet 24 is lifted from the pile by vacuum lifter 26, with sheet separator 28 using an air blast to assist in freeing the second sheet. The leading end of the sheet is then introduced into supply rolls which move the sheet onto conveyor 42. Lateral displacement of the sheet is prevented by guide members 50. When the first sheet reaches press feed rolls 12 the leading edge of the sheet is moved forwardly into registry with the dies. For convenience, a reference mark may be placed on the press for effecting initial registry. The first stroke of the press generates pilot holes in the sheet which assist with registered movement of the sheet through the progressive die set. Operation of the press is then initiated. When the trailing edge of the lead sheet reaches the registry point, the registry bar 74 will be in its uppermost position in engagement with the sheet and will cooperate with guide member 90 to raise the trailing end of the leading sheet. At or prior to this time a trailing sheet will have been moved into abutting contact with lateral sheet engaging surface 78 of registry bar 74. Control means then activate fluid cylinders 120 to move the clamping members 100 and 102 downwardly to independently clamp the sheets in registered position. The registry bar 74 moves downwardly responsive to the downward movement of the clamping members 100, 102. Control means actuate the stapling units 160, 162 as soon as clamping has been effected. After the stapling has been completed the clamping members 100, 102 are raised and the registry bar 74 returns to its upper position. The feed rolls 12 then advance the joined sheet to advance the same a distance equivalent to the distance between a pair of progressive dies in die sets 10. After a predetermined number of advances by press feed rolls 12, the trailing sheet will assume the position of a leading sheet and a new trailing sheet will be provided in registered position. The cycle is then repeated.

While it is preferred and generally most convenient to have the feed rolls withdraw the joined sheet and introduce it directly into the multistage press, it will be appreciated that where desired the joined sheet emerging from the joining sector 6 may be wound onto a coil for storage.

It will be appreciated, therefore, that the apparatus and method of this invention provide a means for obtaining the benefit of sheet printing speeds as compared with the slower coil printing speeds. In addition, the cumulative registration problem encountered with respect to printed coils in multistage fabricating operations is eliminated. The sheets are automatically removed from a stack, transferred to a joining area where they are registered, clamped and joined all during a normal press idling period. The emerging joined sheet which is produced with independent registry of each sheet element may then be transferred directly to the feed rolls to a multistage fabricating press or may be rewound for storage. Operating means may be provided to effectively coordinate the operation of each independent element of this system. All of this is accomplished while retaining flexibility as to type of sheet pattern, the type of joint formed, the type of fastening means employed and the type of control systems used.

Whereas particular embodiments of the invention have been described above for purposes of illustration, it will be evident to those skilled in the art that numerous variations of the details may be made without departing from the invention as defined in the appended claims.

We claim:
1. Apparatus for joining ends of sheet-like material to provide a continuous strip comprising
   sheet transporting means for moving said sheets to a joining station,
   registry means disposed within said joining station for establishing a registered relationship between adjacent sheets by raising the trailing end of a leading sheet and stopping forward movement of said trailing sheet by engaging the leading end of said trailing sheet,
   first clamping means disposed rearwardly of said registry means for securing said trailing sheet in registered position,
   second clamping means disposed forwardly of said registry means for securing said leading sheet in registered position,
   joining means for establishing said joint while said sheets are clamped in said registered position, and control means for coordinating operation of said first and second clamping means with the operation of said joining means.

2. The apparatus of claim 1, wherein
said registry means has a vertically reciprocating registry bar, and
said first and second clamping means each has a stationary clamping member cooperating with a movable clamping member operated by a fluid cylinder.

3. The apparatus of claim 2, wherein
operating means for moving said registry bar responsive to movement of at least one of said clamping means,
said operating means has linkage means connecting at least one of said first and second clamping means with said registry bar,
said linkage means moving said registry bar downwardly responsive to movement of said clamping means into sheet clamping position, and
said linkage means moving said registry bar upwardly responsive to movement of said clamping means out of sheet clamping position.

4. The apparatus of claim 3, wherein
automatic supply means for sequentially separating and moving individual sheets of material from a pile of sheets to said sheet transporting means,
a multiple die press for sequentially performing multiple fabricating operations on said continuous strip after joinder of said sheets,
press feed means for transporting said continuous strip of joined sheets from said joining station to said multiple die press,
said control means adapted to permit operation of said press feed means solely during press idle periods,
said control means initiate closing of said first and second clamping means solely during an interval when said press feed means is not transporting said continuous strip to said press, and
said registry means adapted to register sheet having a pattern on at least one surface with respect to said multiple die press.

5. The apparatus of claim 4, wherein
said registry bar has an upper sheet engaging surface for engaging the undersurface of a trailing end of a leading sheet and a lateral sheet engaging surface for engaging the leading end of a trailing sheet,
said sheet transporting means has an endless belt conveyor for transporting said sheets to said joining station,
said registry bar in its uppermost position has said upper sheet engaging surface disposed at a higher elevation than said endless belt conveyor, and
said registry bar in its uppermost position has at least a portion of said lateral sheet engaging surface at a higher elevation than said endless belt conveyor.

6. The apparatus of claim 4 including
said joining station having a stationary flat generally horizontal portion upon which said sheets are received,
said sheet transporting means having an elongated stationary table portion, and
at least one driven roller roatably mounted in overlying position with respect to said elongated stationary table for moving said sheets therealong.

7. The apparatus of claim 4, wherein
said automatic supply means has at least one vacuum sheet pickup for lifting a sheet from a pile of sheets,
said automatic supply means has at least one air nozzle for assisting in separating the top sheet of a pile from the immediately underlying sheet,
said sheet transporting means has a pair of feed rolls disposed rearwardly of said conveyor for receiving sheets from said automatic supply means, and lateral guide means to prevent lateral displacement of said sheets while moving on said conveyor.

8. The apparatus of claim 4, wherein
said joining means has a pair of stapler heads each adapted to cooperate with a stapler anvil to secure said registered sheet ends by means of staples secured closely adjacent the transverse edges of said sheets, and
control means for operating said staplers solely when said first and second clamping means are in closed position.

9. The apparatus of claim 8, wherein
a first guide member is disposed forwardly of said first clamping means at a higher level than the sheet carrying surface of said sheet transporting means for limiting lifting of the leading end of the trailing sheet, and
a second guide member is disposed rearwardly of said second clamping means at a higher level than said sheet carrying surface of said sheet transporting means for cooperating with said registry bar to increase the elevation of the trailing edge of said leading sheet.

10. The apparatus of claim 9, wherein
said stapler heads are so disposed with respect to said registry bar that said joint will be effected with each depending leg of each staple passing through only one of said sheets, and
said first and second guide members each terminate in a generally downwardly directed free end having a roller member.

11. The apparatus of claim 9, wherein
said apparatus is adapted for establishing a continuous strip by joining printed sheets having a multiplicity of image portions to be severed by said press,
the distance between said first die of said multistage press and said registry bar is such that each successive joint will index the pattern portions on said trailing sheet with respect to said first die, and
said stapler heads are so disposed as to insert said staples into said sheets at a position not penetrating any image portion of said sheets.

12. The apparatus of claim 9, wherein
said press feed means has a pair of feed rolls provided with sheet contacting surfaces, and
said sheet contacting surfaces of said feed rolls are adapted to engage less than the full transverse width of said continuous strip.

13. A method of sequentially joining sheet-like materials to provide a registered continuous strip of joined sheets, comprising
providing a leading sheet in contact with registry means,
automatically feeding a trailing sheet forwardly into contact with registry means,
substantially simultaneously raising the trailing end of said leading sheet at said registry means,
clamping said sheets in said registered position to prevent relative longitudinal movement therebetween,
securing fastening means to said clamped sheets to establish said joint, and
unclamping said joined sheets and moving them forwardly as a unit.

14. The method of claim 13, including
providing sheets which are patterned on at least one surface,
prior to clamping said registered sheets moving the leading sheet forwardly to a registering position and moving the trailing sheet forwardly until its forward edge engages said registry means,
clamping said registered sheets in edge-to-edge abutting relationship,
stapling said abutting sheet edges closely adjacent the transverse sides of said sheets with said staples not passing through said lithographed portions of said sheet, and
subsequently feeding said continuous strip of joined sheets into a press having a progressive die.

15. The method of claim 13, including
providing sheets which are patterned on at least one surface,
providing a registry bar within said registry means,
feeding said registered joined sheets into a press having a progressive die,
positioning said registered sheets with their ends overlapping prior to clamping,
prior to clamping moving the leading sheet forwardly to a registering position and moving the trailing sheet forwardly until it contacts said registry bar, and
stapling said overlapping sheet edges closely adjacent the transverse edges of said sheets.

16. The method of claim 13, wherein
providing a registry bar within said registry means,
continuously urging said trailing sheet forwardly prior to clamping while said trailing sheet is in contact with said registry bar.

17. The method of claim 14, including
providing a registry bar within said registry means,
establishing the position of said registry bar with respect to said first die such that the lithographed pattern on said trailing sheet is in registry with respect to said first die by positioning said leading sheet with its leading edge in registry with said first die and positioning said registry bar with respect to said leading sheet so as to provide for stoppage of forward movement of said trailing sheet at a position which will produce registered joinder of said trailing sheet with respect to said leading sheet.

References Cited
UNITED STATES PATENTS

| | | | |
|---|---|---|---|
| 3,137,936 | 6/1964 | Tomkins | 29—429X |
| 3,263,321 | 8/1966 | Lombardi | 29—429 |
| 3,264,724 | 8/1966 | Griesser | 29—417 |
| 3,474,514 | 10/1969 | Lambardi | 29—200 |

THOMAS H. EAGER, Primary Examiner

U.S. Cl. X.R.

29—200B, 208C, 200P, 464

UNITED STATES PATENT OFFICE
CERTIFICATE OF CORRECTION

Patent No. 3,605,249  Dated September 20, 1971

Inventor(s) Howard R. Kutcher et al

It is certified that error appears in the above-identified patent and that said Letters Patent are hereby corrected as shown below:

| | |
|---|---|
| Col. 1, line 70 | Change "continous" to --continuous--. |
| Col. 2, line 24 | Change "feed" to --fed--. |
| Col. 3, line 63 | Change "reegistry" to --registry--. |
| Col. 6, line 3 | Change "rightly" to --rigidly--. |
| Col. 6, line 27 | Change "referring" to --reference--. |
| Col. 7, line 16 | After "leg" insert --206--. |
| Col. 9, line 34 | Change "joined" to --joinder--. |
| Col. 9, line 58 | Change "joiner" to --joinder--. |
| Col. 9, line 64 | Change "joiner" to --joinder--. |
| Col. 10, line 68 | Change "rewardly" to --rearwardly--. |
| Col. 11, line 63 | Change "roatably" to --rotatably--. |
| Col. 14, line 14 | Change "Lambardi" to --Lombardi--. |

Signed and sealed this 21st day of March 1972.

(SEAL)
Attest:

EDWARD M. FLETCHER, JR.          ROBERT GOTTSCHALK
Attesting Officer                 Commissioner of Patents